No. 765,717. PATENTED JULY 26, 1904.
F. P. SHAW.
MACHINE FOR PREPARING AND SPINNING WORSTED.
APPLICATION FILED APR. 5, 1904.
NO MODEL. 4 SHEETS—SHEET 1.
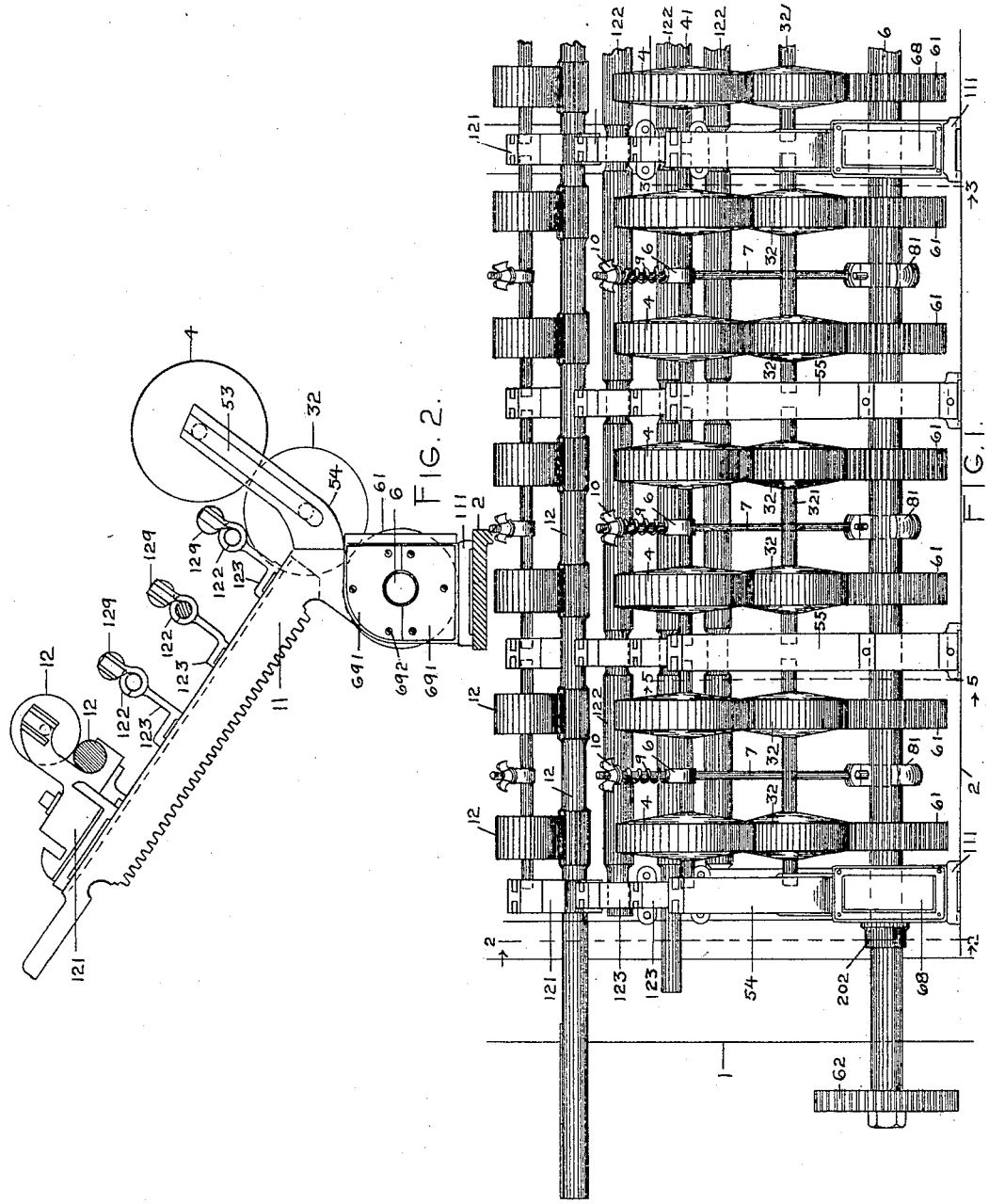
WITNESSES.
C. E. Spaulding
Channing Whitaker
INVENTOR.
Fred P. Shaw.

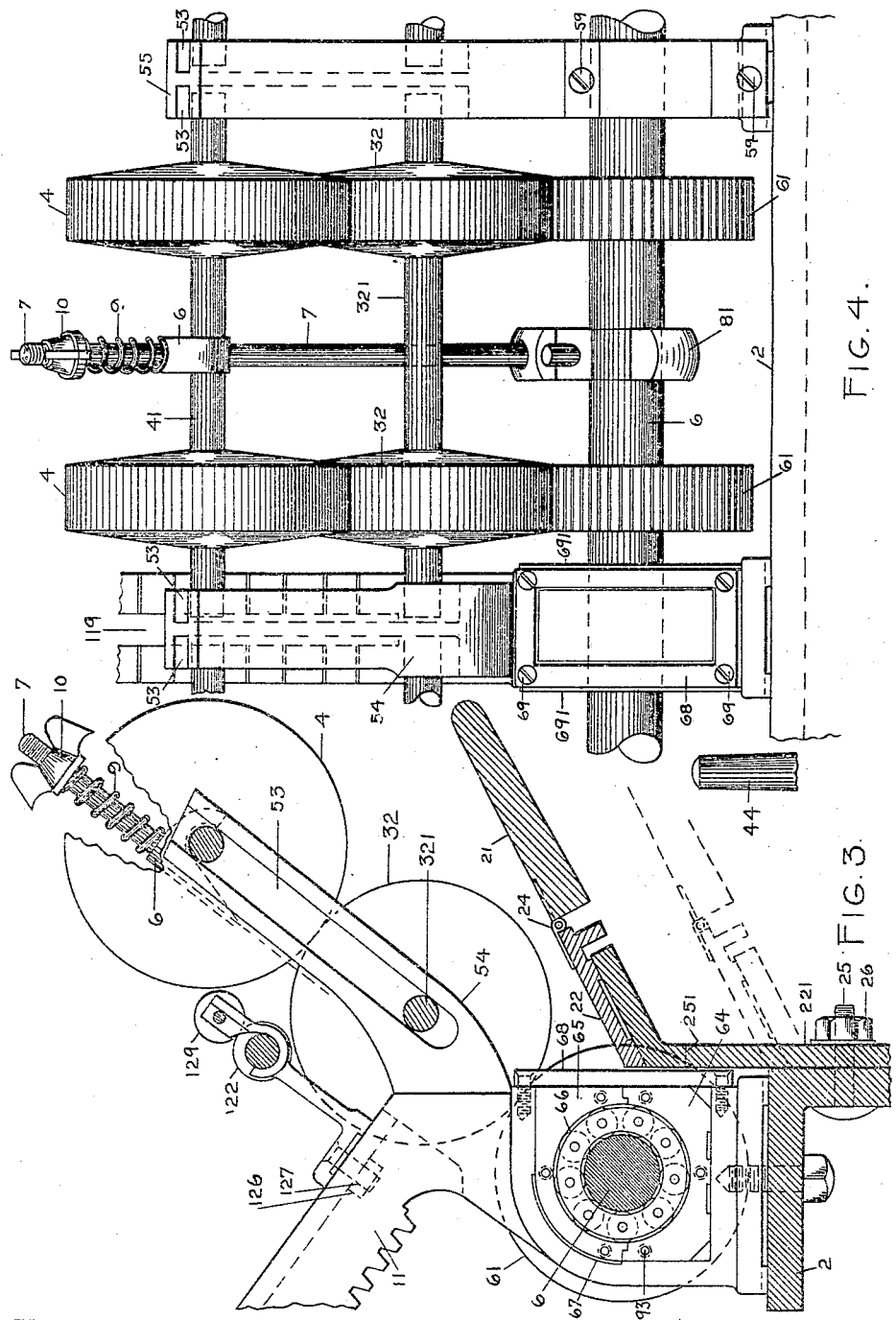

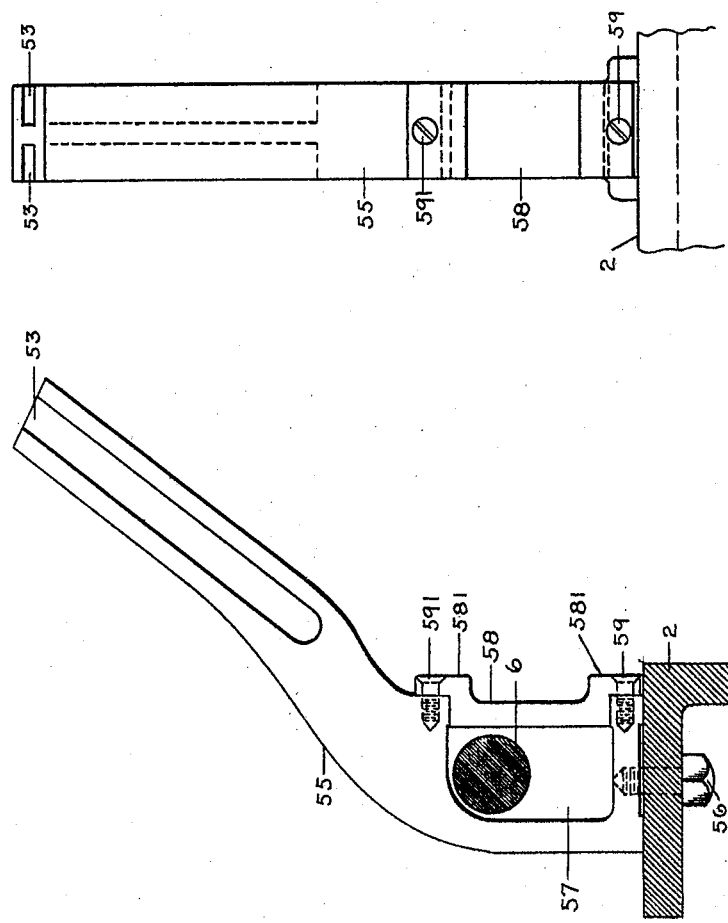

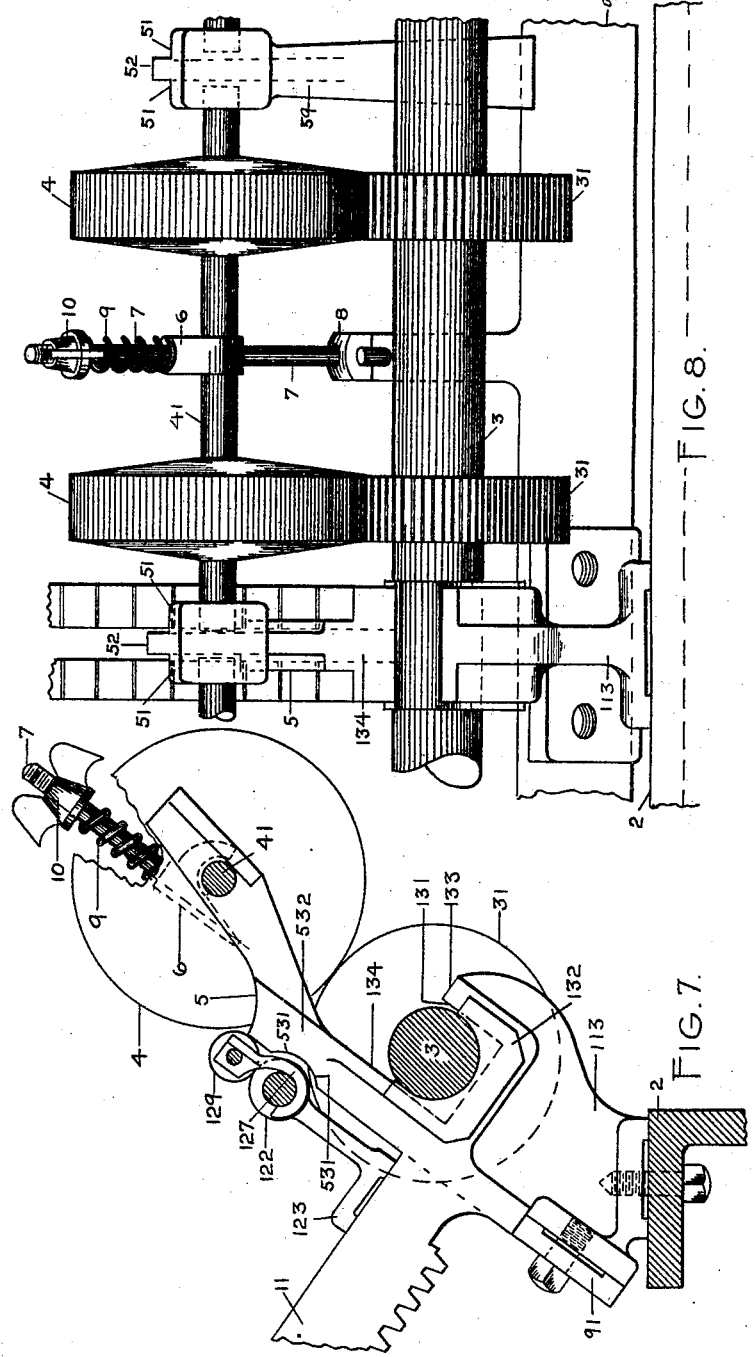

No. 765,717.                                          Patented July 26, 1904.

UNITED STATES PATENT OFFICE.

FREDERICK PIERPONT SHAW, OF LOWELL, MASSACHUSETTS, ASSIGNOR TO LOWELL MACHINE SHOP, OF LOWELL, MASSACHUSETTS, A CORPORATION OF MASSACHUSETTS.

MACHINE FOR PREPARING AND SPINNING WORSTED.

SPECIFICATION forming part of Letters Patent No. 765,717, dated July 26, 1904.

Application filed April 5, 1904. Serial No. 201,738. (No model.)

*To all whom it may concern:*

Be it known that I, FREDERICK PIERPONT SHAW, residing at Lowell, in the county of Middlesex and State of Massachusetts, have invented certain new and useful Improvements in Machines for Preparing and Spinning Worsted, of which the following description, with the accompanying drawings, is a specification, like numerals on the drawings denoting like parts.

The invention has relation to drawing mechanism of the type that is employed in machines for preparing and spinning worsted and the like.

In particular the invention relates to the front drawing-rolls of mechanism of such type and to the means of supporting and driving the said front drawing-rolls.

The invention consists in the improvements which I will describe with reference to the accompanying drawings, in which latter I have illustrated an embodiment of the said improvements in connection with a drawing mechanism which in general respects is of the character heretofore in use in worsted-spinning frames.

In the drawings, Figure 1, Sheet 1, shows in front elevation a portion of the length of the said drawing mechanism with the present invention applied thereto. Fig. 2, Sheet 1, is a view mainly in end elevation, showing the parts which are located at the right-hand side of the dotted line 2 2, Fig. 1. Fig. 3, Sheet 2, is a view on a somewhat enlarged scale, partly in vertical section on the plane that is indicated by the dotted line 3 3 in Fig. 1, showing certain parts that are located at the front of the drawing mechanism and illustrating the features of the present invention. This figure shows the fly-board and thread-board of a spinning-frame and the upper end of a spindle. Fig. 4, Sheet 2, shows in front elevation the parts which are represented in Fig. 3, omitting, however, the fly - board, thread - board, spindle, front carrier - roll, presser-roll, and front carrier-stand. Fig. 5, Sheet 3, is a detail view, in vertical section, on the dotted line 5 5 of Fig. 1, showing chiefly one of the intermediate horns or guides for the front drawing-rolls and its relations to the roller-beam and to the supplemental shaft which is employed in connection with the sectional lower front drawing - rolls. Fig. 6, Sheet 3, shows the parts of Fig. 5 in front elevation. Fig. 7, Sheet 4, is a view similar in character to Fig. 3, showing certain features of construction heretofore commonly in use and upon which I have sought to improve. Fig. 8, Sheet 4, is a view showing the parts of Fig. 7 in front elevation, omitting, however, the front carrier-roll, presser-roll, and front carrier-stand.

Having reference to the drawings, and more particularly first to Figs. 1 and 2, 1 is one of the machine end frames, and 2 is a beam which extends longitudinally of the machine at the front of the latter and is attached to the fixed framework of the machine. The said beam is usually called the "roller-beam" and is referred to hereinafter by such name. Roll-stands, usually termed "carriage-stands" in the art, are shown at 11 11. A number of these are employed in the length of the machine. Their front ends are provided with feet 111 111, which rest upon and are secured to the roller-beam. Their rear ends are supported by portions of the framework which are not shown in the drawings. The rear drawing-rolls are represented at 12 12, and at 121 121 are shown stands by which the said rear drawing-rolls are supported. The said stands are mounted upon the roll-stands, being applied to the slideways or guideways with which the said roll-stands are provided and being adjustable in well-known manner along the said slideways or guideways in the direction from front to rear in the machine to increase or diminish the distance separating the said rear drawing-rolls from the front drawing-rolls.

At 122 122, &c., are shown the usual carrier-rolls, which are located intermediate the rear drawing-rolls and the front drawing-rolls, and at 123 123 are shown the carrier-stands, in which the carrier-rolls are mounted, the said carrier-stands being mounted upon the said roll-stands and adjustable along the slideways or guideways of the latter in usual manner in the direction from front to rear in the machine. To render the carrier-stands thus adjustable, the body portions of the roll-stands are longitudinally slotted, as at 119, Fig. 4, and through the slot 119 of a roll-stand are passed the stems of the securing screws or bolts 127, Fig. 3.

In Fig. 3, 126 is a nut which is applied to the screw or bolt 127 and takes against the under side of the slotted portion of the roll-stand to clamp the carrier-stand in place. The usual wooden presser-rolls, which are applied in practice to the carrier-rolls for the purpose of holding the slivers or rovings pressed lightly against the latter, are omitted from Fig. 1, but are shown in Fig. 2 at 129 129. The ends of the said presser-rolls are applied to guides with which the carrier-stands are furnished. The foregoing parts are all old and may be of any usual or preferred construction in practice, except that in carrying the invention into effect the front ends of the roll-stands are constructed and adapted as presently will be explained.

Before describing my improvements in the front drawing-rolls and in the means of supporting and driving the same I will first describe the usual construction with the aid of Figs. 7 and 8, Sheet 4, and will then proceed to explain the nature of the said improvements. The said usual construction (see Figs. 7 and 8) contains a lower front drawing-roll comprising a shaft 3 and drawing-bosses 31 31 upon the said shaft. The shaft 3 is either in fact or in effect a continuous shaft extending from end to end of the mechanism, it being in the case of the longer frames usually constructed in lengths which are coupled together to rotate in unison. It is actuated by driving power, which is transmitted thereto by gearing located at one end thereof, and it is supported in bearings, one of which is shown at 132, which are contained in bearing seats or sockets 131, that are formed in the front ends of the roll-stands 11 11. The front top rolls, which coöperate with the bosses 31 31 of the lower front drawing-roll, consist of bosses 4 4, which are attached in pairs to short shafts 41 41, the ends of each such short shaft projecting at the opposite sides of the pair of bosses thereon to constitute journals. The peripheries of the bosses 4 4 of the front top rolls coöperate with those of the bosses 31 31 of the lower front drawing-roll, and the working positions of the front top rolls with respect to the lower front drawing-roll are determined by the usual fixed "horns," so called, (shown at 5 59,) the said horns rising adjacent the bosses 31 31 and constituting guides for the said journals of the front top rolls. One of the said horns, as 5, is provided upon each roll-stand, while intermediate the roll-stands other horns (designated 59 59) are mounted upon a convenient support, which in Fig. 8 is a supplemental rail or beam 91, extending lengthwise of the drawing mechanism. In the usual construction each horn is furnished with one or more laterally-projecting wings 51 51, against the rear faces of which the journals of the front top rolls rest, and each horn has a longitudinally-extending rib 52. The ribs 52 52 of the respective horns serve as guides, which coact with the ends of the journals of the front top rolls to prevent endwise movement of the said top rolls, and thereby fix the position, transversely considered, of the bosses 4 4 of the latter with relation to the bosses 31 31, &c., of the front drawing-roll. In the case of the horns which are located intermediate the extreme ones at the opposite ends of the machine the rib of each horn intervenes between and separates the adjacent journals of two adjacent pairs of front top rolls.

A customary construction and arrangement of pressure or tension devices whereby to press the bosses 4 4 of the front top rolls against the bosses 31 31 of the lower front drawing-roll is illustrated in Figs. 7 and 8. The said pressure or tension devices comprise for each pair of front top-roll bosses a saddle 6, stirrup 7, hook 8, expanding spiral spring 9, and thumb-nut 10. The said saddle 6 engages with the upper side of the shaft 41 of such pair of bosses intermediate the said bosses. The stirrup 7 has the stem thereof passed through a hole in the said saddle and its hook-shaped lower end passed through a hole in the fixed so-called "hook" 8, which in the present instance projects from the rail 91, the said lower end of the stirrup being engaged with the said hook. The expanding spiral spring 9 surrounds the upper portion of the said stem above the saddle. The thumb-nut 10 is screwed upon the upper end of the stirrup, the said spring being compressed between the thumb-nut and the saddle and its tension being adjusted by means of the said thumb-nut to secure the desired pressure of the top-roll bosses 4 4 against the bosses 31 31. Pressure or tension devices, ordinarily similar in the main to those which are used in connection with the front top rolls, are used in connection with the rear drawing-rolls.

In the old construction, which is shown in Figs. 7 and 8, the bearing 132 is a simple open-topped bearing or half-box. The seat or socket 131, which receives and contains the said bearing or half-box, is formed in the front end of the roll-stand and opens upwardly at right angles to the length of the slideway or guideway of the roll-stand. It is open-topped. The front wall 133 of the said seat or socket rises above the top of the front wall of the bearing; but above the said front wall 133, between the same and the upper portion of the horn 5, with which the roll-stand is formed, there is an unobstructed opening to afford opportunity to insert the bearing or the shaft of the lower front drawing-roll by first moving the same rearward into a position above and in line with the opening of the seat or socket and then moving it downward in the direction of the said opening into working position within the seat or socket and to remove the said shaft or the bearing by the reverse action. The horn 5 must be so shaped and located that it will not interfere with the insertion and removal of the lower front drawing-roll and the bearing 132. Hence at the front it must not extend into the path which is required to be taken by the shaft and bearing in being inserted or removed. In addition in order to enable the bite of the front carrier-roll 122 and its presser-roll 129 to be set as close to the bite of the front drawing-rolls as possible, as sometimes is required in practice, the horn must not interfere with adjustment of the front carrier-stand far enough forward upon the roll-stand to give the front carrier-roll 122 and its presser-roll 129 a position in which the peripheries of the said rolls just clear the peripheries of the bosses 4 4 and 31 31 of the front drawing-rolls. Hence at the rear thereof the horn must be so shaped and located as to permit such adjustment to be made. In order to meet these requirements, the lower portion of the horn is formed as a post rising from the roll-stand at right angles to the length of the slideway or guideway. At the front thereof the said post is formed with a straight surface 134, constituting the upper portion of the rear wall of the seat or socket 131 and also extending in continuation thereof to a distance from said seat or socket sufficient to enable the bearing 132 to assume in the process of being inserted into the bearing seat or socket or removed therefrom a position in line with the seat or socket, but entirely above the upper end of the front wall 133 of the latter. This straight surface acts as a guide for the bearing and shaft in being inserted into place or removed therefrom. The rear side of the horn is located in advance of the foremost position which is required to be assumed by the front carrier-stand, and in order to enable the latter to fit closely up against the horn the said rear side is formed with a hollow 531, which receives the forwardly-projecting convexity 127 of the bearing portion of the said carrier-stand. The thickness of the neck or contracted portion 532 of the post of the horn in the direction from front to rear must be sufficient to insure enough material at the said neck in front of the hollow 531 to confer strength to obviate liability to breakage at such neck. Hence, inasmuch as the space at the rear of the journal portion of the shaft of the lower front drawing-roll, measuring in the direction from front to rear in the machine, which is available to be occupied by the post of the horn and the portion of the bearing that projects rearward of the said journal portion is small and as the proportion thereof that is required to be devoted to securing sufficient thickness of the horn at the neck 532 is relatively considerable, only a short distance intervenes in practice between the straight front surface 134 of the post of the horn and the surface of the journal portion to receive the rear wall of the bearing 132. Therefore the said rear wall of the said bearing is made quite thin at its upper edge. In all instances known to me heretofore the bearing 132 has been a plain or simple bearing, and for want of room, &c., for the convenient application of a cover the said bearing has been left unprovided with a cover, as in Figs. 7 and 8. In operation the portions of the shaft of the lower front drawing-roll which work in the bearings become covered with lubricant, and in consequence of the absence of covers dust and flyings collect upon such portions. As a result the lubricant of the bearings becomes charged with impurities, which latter clog the bearings and cause cutting of the shaft and the bearings as well as occasion other injuries. The cutting of the shaft by particles of wool which work in between them progresses rapidly and is an extensive and serious cause of trouble.

The principal objects of my present invention are to obviate the limitations and restrictions which heretofore have existed with respect to the bearing, to enable a bearing of any approved proportions and character to be employed, and more especially to render feasible and practicable the use of a roller-bearing and to facilitate the use of a bearing in which the bearing-surfaces are cased in and protected. In carrying my present invention into effect instead of the usual lower front drawing-roll, which is shown in Figs. 7 and 8 and which, as I have stated, consists of the shaft 3, extending lengthwise of the drawing mechanism, supported by bearings at intervals in its length and actuated by driving power transmitted to the same at one end thereof, and the drawing-bosses 31 31, mounted on said shaft intermediate the said bearings, I employ a series of drawing-roll sections which are similar in general character to the top-roll sections and respectively are furnished with one or more drawing-bosses and a supplemental roll which is mounted in bearings, as hereinafter described, and coöperates with the said sections to drive the latter, or preferably both drive and support the same, all as I will now proceed to explain with reference to the embodiment of the invention which is illustrated in Figs. 1 to 6. In the said embodiment the lower front drawing-rolls resemble the top front rolls in that each section thereof comprises two drawing-bosses 32 32, which are mounted upon a short shaft 321, the ends of the said short shaft projecting beyond the said bosses 32 32 to constitute journals. The said journals and also those of the front top rolls are received in the slots or guideways 53 53 of fixtures 54 55, which correspond in position, and essentially in function, with the horns 5 59 of Figs. 7 and 8. Thereby the working positions of the front drawing-rolls, both top and lower, are fixed or determined. The fixtures 54 55 are referred to hereinafter as "fixed" horns or guides. In the present instance I have illustrated one thereof (designated 54) provided upon the front end of each roll-stand, as in the case of the horns 5 of the old construction, while intermediate the roll-stands others, (designated 55,) and corresponding in a sense with the horns 59 of the old construction, are mounted upon the roller-beam, although I may in practice provide in some other convenient manner for the support of these latter. The supplemental roll is designated 6. The lower front drawing-roll sections are placed in driving relations with the said supplemental roll 6 to enable them to be actuated through the latter, preferably through the engagement of the peripheries of the bosses 32 32 of the said sections with the supplemental roll. I have shown the latter provided with enlargements or bosses to coact with the said bosses 32 32 and with journal portions which are comparatively small in diameter. This is a desirable construction, inasmuch as it enables the drawing-rolls to be actuated by the peripheries of the said enlargements or bosses at the required rate of speed, while the rate of movement of the journal portions within the bearings is relatively small. Moreover, through the employment of a supplemental roll which between the enlargements or bosses is simply of sufficient diameter to withstand the torsional strains that are developed therein by transmitting driving power therethrough to the drawing-rolls, and to withstand such transverse pressure as may be exerted by the drawing-rolls the said supplemental roll is enabled to be made much lighter in weight than if constructed throughout of the diameter which is desirable at the places where it engages with the bosses 32 32. The location of the axis of this supplemental roll may vary in practice more or less, according as the said roll is employed, either simply as a driver or to support the lower front drawing-rolls, as well as communicate rotary movement thereto. In the more complete embodiment of the principles of the invention the supplemental roll is employed as both a support and a driver, and preferably it is arranged, as shown in the drawings, with its axis located in the plane (extended) of the axes of the slots or guideways 53 53 of the fixed guides or horns 54 55. (See more particularly Fig. 3, Sheet 2, of the drawings.) It will be apparent that with this arrangement any pressure which may be transmitted from the front top rolls to the lower front drawing-rolls, together with more or less of the weight of both the top and the lower front drawing-rolls, will be transmitted to the supplemental roll 6 and thence to the bearings in which the said supplemental roll is mounted. The means for driving the said roll 6 may vary in practice. I have shown in Fig. 1 a spur-gear 62 fast upon one end of the same, which is designed for operative engagement with a suitable actuating-train. (Not shown.)

The short shafts 321 321 of the lower front drawing-roll sections are not called upon to withstand either torsional strain or transverse pressure. Consequently they may be made much less in diameter than the shaft 3 of the lower front drawing-roll in Figs. 7 and 8, as will be apparent from Figs. 3 and 4. The small diameter of the journal portions of the shafts 321 321 enables the guides 54 54 to be placed well to the front, as indicated most clearly in Fig. 3, thereby leaving at the rear of said guides ample room to permit of adjustment of the front carrier-stand forward to the full desired extent.

It will be clear that the limitations and restrictions which are imposed with respect to the bearings by the arrangement and relations of the parts in the prior construction that is shown in Figs. 7 and 8 do not exist in the case of the bearings for the supplemental roll 6 of the construction which is represented in Figs. 1 to 6. Accordingly in the latter construction the bearings may be made of ample proportions, and roller-bearings may be employed, if desired. I have indicated the use of roller-bearings, Fig. 3 showing a roller-bearing which comprises, essentially, the lower half-box 64 and upper half-box 65 and a series of antifriction-rolls 66 66, surrounding the journal portion of the roll 6 and intervening between the journal and the contiguous surfaces of the two half-boxes. Usually the said antifriction-rolls will make contact with the concave surface of the lower half-box only. The location of the bearings for the supplemental roll 6 may vary in practice, and so, also, may the means and manner of supporting and mounting the same. Preferably the said bearings are applied to the roll-stands. In the present instance the front end of each of the latter is provided with a bearing seat or socket, the latter being open at the front thereof for the insertion and removal of the roll and bearing. The opening is closed by a cap or cover 68, which is attached to the roll-stand by means of screws 69 69, Fig. 4. For the purpose of closing the opposite ends of the bearing against the admission of dust, flyings, &c., upper and lower casing-plates 691 691 are employed. These are fastened to the opposite sides of the roll-stands by means of screws 692, Fig. 2. The stems of the said screws enter threaded holes 693 693, Fig. 3, which are tapped in the opposite ends of the half-boxes 64 65. The casing-plates meet at front and rear of the shaft 6 of the supplemental roll and are concaved to fit closely around the said shaft.

Figs. 5 and 6 show a horn or guide 55 of a form which I have devised for use in positions intermediate the roll-stands, it being mounted upon the roller-beam 2, to which it is attached by a screw 56. The base portion of the said horn or guide is chambered, as at 57, Fig. 5, to receive the roll 6, the chamber being closed at the front by means of a plate 58. The said plate is shaped to enter the forward portion of the chamber and to fit at its upper and lower ends against the top and bottom surfaces of the chamber, so as to afford vertical support to the upper portion of the horn or guide at the front. The plate 58 also is formed at top and bottom with lips or flanges 581 581, which lie against the front side of the base portion of the horn or guide, and it is secured in place by means of screws 591 591, the stems of which pass through holes in the said lips or flanges into threaded holes that are tapped in the said base portion.

The top rolls are pressed against the bottom rolls and the latter against the supplemental roll by means of tension or pressure devices on the order of those which have been employed heretofore. The stirrup 7 of such devices may be connected with a hook 8, as in Figs. 7 and 8, or I may engage the hooked lower end of the same with a bearing or saddle 81, which is fitted to a reduced portion of the shaft of the supplemental roll 6, as shown best in Fig. 4. The arrangement shown in Fig. 4 has the advantage that the tension or pressure devices act simply to compress the rolls together, and the strain or pressure due to the action of such devices is not transmitted to the bearings which support the rolls, as in the case of the arrangement shown in Figs. 7 and 8.

In order to accommodate the supplemental roll 6 and the bearings for the said roll in positions below the lower front drawing-rolls, the front ends of the roll-stands 11 are made of greater height than in the case of the usual construction shown in Figs. 7 and 8, and the roller-beam 2 is set a corresponding distance lower in the machine-frame. In a spinning-frame the thread-board 21, Fig. 3, generally is supported upon the roller-beam 2, frequently through the intervention of a fly-board 22, the thread-board being pivoted to the fly-board, as at 24, and the fly-board being attached to the front of the roller-beam, as by means of brackets 221, bolts 25, and nuts 26. When operating with the tip of the spindle 44 located at the distance from the bite of the front drawing-roll which is represented in Fig. 3, the thread-board should stand at the height at which it is represented in the said figure. In this position of the thread-board the thread-board and fly-board 22 are located in front of and in line with the said bearing. I make provision for enabling the thread-board and fly-board to be moved out of the way of the bearing when it is desired to remove the latter. This I accomplish by movably attaching the fly-board to the roller-beam. Thus the hole or opening 251, that is formed through the downwardly-extending bracket 221 of the fly-board, is elongated vertically, constituting a slot which permits the fly-board to slide down from the full-line position that is represented in Fig. 3 to the dotted-line retracted position in the said figure, and vice versa. The said slot also permits the fly-board and thread-board to be adjusted vertically to suit the height of the tip of the spindle.

I claim as my invention—

1. In a drawing mechanism, in combination, a carrier-roll and presser-roll coöperating therewith, a carrier-stand supporting the said rolls and adjustable in the direction from front to rear in the machine, a lower front drawing-roll, a top front drawing-roll, and a supplemental roll mounted adjacent the working position of the lower front drawing-roll and by which the latter is driven.

2. In a drawing mechanism, in combination, a carrier-roll and presser-roll coöperating therewith, a carrier-stand supporting the said rolls and adjustable in the direction from front to rear in the machine, a lower front drawing-roll, a top front drawing-roll, and a supplemental roll mounted adjacent the working position of the lower front drawing-roll and by which the latter is supported and driven.

3. In a drawing mechanism, in combination, a carrier-roll and presser-roll coöperating therewith, a carrier-stand supporting the said roll and adjustable in the direction from front to rear in the machine, sectional lower front drawing-rolls, top front drawing-rolls coöperating with the sectional lower front drawing-rolls, and a supplemental roll extending lengthwise of the drawing mechanism and by which the sections of the said lower front drawing-rolls are driven.

4. In a drawing mechanism, in combination, a carrier-roll and presser-roll coöperating therewith, a carrier-stand supporting the said rolls and adjustable in the direction from front to rear in the machine, sectional lower front drawing-rolls, top front drawing-rolls coöperating with the said sectional lower front drawing-rolls, and a supplemental roll mounted adjacent the working position of the sectional lower front drawing-rolls and by which the latter are supported and driven.

5. In a drawing mechanism, in combination, a carrier-roll and presser-roll coöperating therewith, a carrier-stand supporting the said rolls and adjustable in the direction from front to rear in the machine, lower front drawing-roll sections, top front drawing-rolls coöperating with the said sections, guides receiving the journals of the said sections and top front drawing-rolls, and the supplemental roll with which the said sections operatively engage.

6. In a drawing mechanism, in combination, a carrier-roll and presser-roll coöperating therewith, a carrier-stand supporting the said rolls and adjustable in the direction from front to rear in the machine, lower front drawing-roll sections, top front drawing-rolls coöperating with the said sections, and a supplemental roll extending lengthwise of the drawing mechanism and having enlargements or bosses with which the bosses of the said sections of the lower front drawing-rolls engage.

7. In a drawing mechanism, in combination, a front carrier-roll and its presser-roll, the carrier-stands supporting the said rolls, the lower front drawing-roll sections, the top front drawing-rolls coöperating with the said sections, stands having bearing seats or sockets opening forwardly below the said sections and provided with bearings, and the supplemental roll extending lengthwise of the drawing mechism, mounted in the said bearings and with which the said sections engage.

8. In a drawing mechanism, in combination, a carrier-roll and presser-roll coöperating therewith, carrier-stands supporting the said rolls, the lower front drawing-roll sections, the top front drawing-rolls coöperating with said sections, stands having bearing seats or sockets opening forwardly below the said sections and provided with bearings, and the supplemental roll extending lengthwise of the drawing mechanism, mounted in the said bearings, and provided with the enlargements or bosses with which the said sections engage.

9. In a drawing mechanism, in combination, a carrier-roll and presser-roll coöperating therewith, carrier-stands supporting the said rolls, the lower front drawing-roll sections, the top front drawing-rolls coöperating with the said sections, stands having bearing seats or sockets opening forwardly below the said sections and provided with bearings, the supplemental roll extending lengthwise of the drawing mechanism and mounted in the said bearings, and tension or pressure devices by which the top front drawing-rolls are pressed against the said sections and the latter are pressed against the said supplemental roll.

10. In a drawing mechanism, in combination, a carrier-roll and presser-roll coöperating therewith, carrier-stands supporting the said rolls, the lower front drawing-roll sections, the top front drawing-rolls, stands having bearing seats or sockets opening forwardly below the said sections and provided with bearings, the supplemental roll mounted in the said bearings and coöperating with the said sections, and the thread-board located in advance of the said bearing seat or socket and movable to permit of the unobstructed insertion and removal of the said supplemental roll.

11. In a drawing mechanism, in combination, a carrier-roll and press-roll coöperating therewith, carrier-stands supporting the said rolls, the lower front drawing-roll sections, the top front drawing-rolls, stands having bearing seats or sockets opening forwardly below the said sections and provided with bearings, the supplemental roll mounted in the said bearings and coöperating with the said sections, and the thread-board located in advance of the said bearing seats or sockets, movable vertically, and adapted to be withdrawn from its working position in line with the openings of the bearing seats or sockets to permit of the insertion and removal of the said supplemental roll.

12. In a drawing mechanism, in combination, a carrier-roll and presser-roll coöperating therewith, a carrier-stand supporting the said rolls and adjustable in the direction from front to rear in the machine, sectional lower front drawing-rolls, a supplemental roll mounted adjacent the working position of the sectional lower front drawing-rolls and by which the latter are supported and driven, and roller-bearings in which the said supplemental roll is mounted.

In testimony whereof I affix my signature in the presence of two witnesses.

FREDERICK PIERPONT SHAW.

Witnesses:
ESTHER PERRY TAYLOR,
IRVING DUNNING KIMBALL.